United States Patent
Toyama et al.

(10) Patent No.: US 10,578,167 B2
(45) Date of Patent: Mar. 3, 2020

(54) VEHICLE CLUTCH APPARATUS

(71) Applicant: Honda Motor Co., Ltd., Tokyo (JP)

(72) Inventors: Naoki Toyama, Wako (JP); Kohei Iizuka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/960,130

(22) Filed: Apr. 23, 2018

(65) Prior Publication Data

US 2018/0313410 A1    Nov. 1, 2018

(30) Foreign Application Priority Data

Apr. 27, 2017    (JP) ................................ 2017-088607

(51) Int. Cl.

| | |
|---|---|
| *F16D 21/06* | (2006.01) |
| *B60K 6/387* | (2007.10) |
| *F16D 13/52* | (2006.01) |
| *F16D 25/0638* | (2006.01) |
| *F16D 25/10* | (2006.01) |

(52) U.S. Cl.

CPC .............. *F16D 21/06* (2013.01); *B60K 6/387* (2013.01); *F16D 13/52* (2013.01); *F16D 25/0638* (2013.01); *F16D 25/10* (2013.01); *B60Y 2200/92* (2013.01); *F16D 2021/0661* (2013.01); *Y10S 903/914* (2013.01)

(58) Field of Classification Search

CPC .. F16D 2021/0661; F16D 21/06; F16D 13/52; F16D 25/0638

See application file for complete search history.

(56) References Cited

U.S. PATENT DOCUMENTS

| | | | |
|---|---|---|---|
| 2007/0175726 A1 | 8/2007 | Combes et al. | |
| 2008/0108468 A1* | 5/2008 | Iwasaki | F16D 21/06 475/31 |
| 2009/0008212 A1 | 1/2009 | Combes et al. | |
| 2013/0056323 A1* | 3/2013 | Jakob-Bodenhagen | F16D 25/082 192/48.603 |

(Continued)

FOREIGN PATENT DOCUMENTS

| | | |
|---|---|---|
| JP | 2002087080 A | 3/2002 |
| JP | 2004-001708 A | 8/2004 |

(Continued)

*Primary Examiner* — Stacey A Fluhart

(74) *Attorney, Agent, or Firm* — Duft & Bornsen, PC

(57) ABSTRACT

A vehicle clutch apparatus, including first, second rotating shaft and a rotating member rotatable around an axis line, a first clutch connecting/disconnecting the first rotating shaft and the rotating member, a second clutch connecting/disconnecting the rotating member and the second rotating shaft, a case member having a non-rotating shaft member extending around the axis line, wherein a clutch hub of the first, second clutch has first, second rotating shaft member integrally rotatably connected to the first, second rotating shaft, a clutch drum of the first, second clutch is integrally rotatably connected to the rotating member and has a third rotating shaft member, and bearings are provided between the second rotating shaft and the non-rotating shaft member, between the second rotating shaft and the first rotating shaft member, and between the second rotating shaft member and the third rotating shaft member.

7 Claims, 4 Drawing Sheets

(56) References Cited

U.S. PATENT DOCUMENTS

2013/0075216 A1\* 3/2013 Seo ................. F16D 25/0638
 192/48.601

FOREIGN PATENT DOCUMENTS

| JP | 2008-501566 A | 1/2008 | | |
|---|---|---|---|---|
| JP | 2008-501900 A | 1/2008 | | |
| JP | 2014-062556 A | 10/2014 | | |
| WO | WO-2016019958 A2 \* | 2/2016 | ............. | F16D 21/06 |

\* cited by examiner

US 10,578,167 B2

VEHICLE CLUTCH APPARATUS

CROSS-REFERENCE TO RELATED APPLICATION

This application is based upon and claims the benefit of priority from Japanese Patent Application No. 2017-088607 filed on Apr. 27, 2017, the content of which is incorporated herein by reference.

BACKGROUND OF THE INVENTION

Field of the Invention

This invention relates to a clutch apparatus for a vehicle which has a pair of clutches disposed parallel in an axial direction.

Description of the Related Art

As apparatuses of this type are known ones that comprise a first clutch for connecting and disconnecting an engine and an electric motor (motor-generator) and a second clutch for connecting and disconnecting the electric motor and a transmission. Such an apparatus is set out in Japanese Unexamined Patent Publication No. 2002-087080 (JP2002-087080A), for example. In the apparatus taught by JP2002-087080A, a rotating shaft is rotatably supported inside a cylindrical portion of a housing by bearings. Clutch hubs for supporting inner plates of the clutches are spline-coupled to an outer peripheral surface of the rotating shaft, and clutch casings for supporting outer plates of the clutches are rotatably supported on an outer peripheral surface of the cylindrical portion by bearings.

In the apparatus set out in JP2002-087080A, the clutch hubs for retaining the inner plates and the clutch casings for retaining the outer plates are respectively supported through bearings on the inner peripheral surface and outer peripheral surface of the casing cylindrical portion. Therefore, in a case where, for example, bending moment acts on the rotating shaft and tilts the clutch hubs, uneven surface contact is apt to arise between the inner plates and outer plates and give rise to strong vibration.

SUMMARY OF THE INVENTION

An aspect of the present invention is a vehicle clutch apparatus, including: a first rotating shaft and a second rotating shaft each rotatable around an axis line; a rotating member rotatable around the axis line; a first clutch of multi-plate wet type configured to connect and disconnect a first power transmission path between the first rotating shaft and the rotating member; a second clutch of multi-plate wet type configured to connect and disconnect a second power transmission path between the rotating member and the second rotating shaft; a case member having a non-rotating shaft member of substantially cylindrical shape extending around the axis line; wherein the first clutch and the second clutch are arranged side by side in an axial direction of the axis line, and each of the first clutch and the second clutch has a plurality of first plates and a plurality of second plates alternately arranged in the axial direction to be rotatable relative to each other, a clutch hub having an inner cylindrical member supporting radially inner end portions of the plurality of first plates movably in the axial direction, and a clutch drum having an outer cylindrical member supporting radially outer end portions of the plurality of second plates movably in the axial direction, the clutch hub of the first clutch is constituted in substantially cylindrical shape around the axis line radially inward of the inner cylindrical member, and has a first rotating shaft member integrally rotatably connected to the first rotating shaft, the clutch hub of the second clutch is constituted in substantially cylindrical shape around the axis line radially inward of the inner cylindrical member, and has a second rotating shaft member integrally rotatably connected to the second rotating shaft, the clutch drum of the first clutch and the clutch drum of the second clutch are constituted by a single shared clutch drum, the single shared clutch drum is integrally rotatably connected to the rotating member, and has a third rotating shaft member of substantially cylindrical shape around the axis line radially inward of the outer cylindrical member and radially outward of the second rotating shaft member, and bearings are provided between an outer peripheral surface of the second rotating shaft and an inner peripheral surface of the non-rotating shaft member, between the outer peripheral surface of the second rotating shaft and an inner peripheral surface of the first rotating shaft member, and between an outer peripheral surface of the second rotating shaft member and an inner peripheral surface of the third rotating shaft member, respectively.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
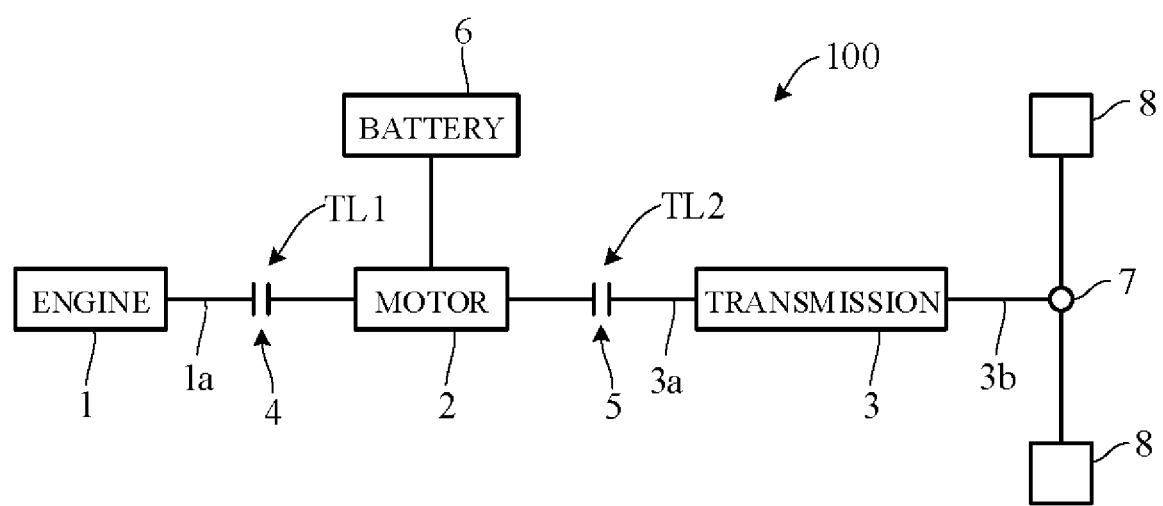
FIG. 1 is a diagram schematically showing overall configuration of a hybrid vehicle drive system including a clutch apparatus according to an embodiment of the present invention.

An embodiment of the present invention is explained in the following with reference to FIGS. 1 to 4. As an embodiment of the present invention is taken an example applied to a front-wheel-drive (FF layout) hybrid vehicle having an engine and an electric motor as propulsion power sources. However, the hybrid vehicle is not limited to the front-wheel-drive layout and can instead adopt some other type of drive system (e.g., a rear-wheel-drive layout). FIG. 1 schematically illustrates overall configuration of the hybrid vehicle drive system incorporating a clutch apparatus according to an embodiment of the present invention, namely, overall configuration of a hybrid vehicle drive unit 100.

As shown in FIG. 1, the drive unit 100 comprises an engine 1, a motor 2, a transmission 3, a disconnect clutch 4, a start clutch 5, and a battery 6.

The engine 1 is an internal combustion engine powered by explosively burning fuel, and can be a gasoline, diesel or other type internal combustion engine. An output shaft 1*a* is constituted by a crankshaft or by a rotating shaft connected to a crankshaft. The disconnect clutch 4 is installed in a first power transmission path TL1 between the engine 1 and motor 2. The disconnect clutch 4 makes and breaks the first power transmission path TL1, whereby motive power is or is not transmitted between the engine 1 and the motor 2.

The motor 2, which is electrically connected to the battery 6, functions as a motor driven by power supplied from the battery 6 and, during braking, functions as a generator that generates power and stores generated power in the battery 6. In other words, the motor 2 operates as a motor-generator. Charge/discharge of the battery 6 is controlled by an unshown control unit. Alternatively, a capacitor or other power storage device can be used instead of the battery 6. The start clutch 5 is installed in a second power transmission path TL2 between the motor 2 and the transmission 3. The start clutch 5 makes and breaks the second power transmission path TL2, whereby motive power is or is not transmitted between the motor 2 and the transmission 3.

The transmission 3 includes hydraulic components driven by hydraulic force and is configured to respond to hydraulic driving of the components by transmitting speed-adjusted rotation of an input shaft 3a to an output shaft 3b and by converting and transmitting to the output shaft 3b torque input to the input shaft 3a. Since the transmission 3 can be used a stepped transmission that manually or automatically shifts among multiple speed stages differing in speed ratio or a continuously variable transmission capable of varying speed ratio steplessly. Torque transmitted to the output shaft 3b is transmitted through a differential mechanism 7 to left and right drive wheels (front wheels) 8, thereby propelling the vehicle.

Typical operating modes of the hybrid vehicle incorporating the aforesaid drive unit 100 will be explained. Operating mode changes in response to engagement (ON) and disengagement (OFF) of the disconnect clutch 4 and the start clutch 5. When the clutches 4 and 5 are engaged and disengaged, the power transmission paths TL1 and TL2 are connected and disconnected.

In stopped condition of the vehicle, with the disconnect clutch 4 turned OFF and the start clutch 5 turned ON, when the motor 2 is driven by power supplied from the battery 6, motive power of the motor 2 is transmitted through the start clutch 5 to the transmission 3. Since this drives the wheels 8, the vehicle begins to run (motor-driven start-off). Thereafter, once rotational speed of the motor 2 has risen, the disconnect clutch 4 is gradually turned ON, so that power of the motor 2 starts the engine 1 by rotating its crankshaft. This is called "push-starting" the engine 1. During push-starting, the disconnect clutch 4 and the start clutch 5 are simultaneously engaged.

When driving force of the engine 1 increases from this state, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When the disconnect clutch 4 is turned OFF while the vehicle is running at a predefined speed, the vehicle thereafter runs solely under power of the motor 2 (EV driving). During vehicle deceleration, the motor 2 is rotated by torque of the transmission 3 received through the start clutch 5. As a result, the motor 2 generates electric power and charges the battery 6 (regeneration).

In stopped condition of the vehicle, when the disconnect clutch 4 is turned ON and the start clutch 5 is turned OFF, the motor 2 is driven by motive power of the engine 1 transmitted through the disconnect clutch 4. The motor 2 therefore generates electric power and charges the battery 6 (stopped-vehicle charging). When the start clutch 5 is gradually turned on while continuing to charge the battery 6, power of the engine 1 is transmitted through the disconnect clutch 4 and the start clutch 5 to the transmission 3. Since this drives the wheels 8, the vehicle begins to run (engine-driven start-off).

In this state, when electric power is supplied to the motor 2 from the battery 6, while motive power of the engine 1 increases, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When supply of power from the battery 6 to the motor 2 is stopped, the vehicle thereafter runs solely under power of the engine 1 (engine driving). When the motor 2 is driven by motive power of the engine 1 at this time, the battery 6 can be charged during engine driving (driving-vehicle charging).

Figure 2:
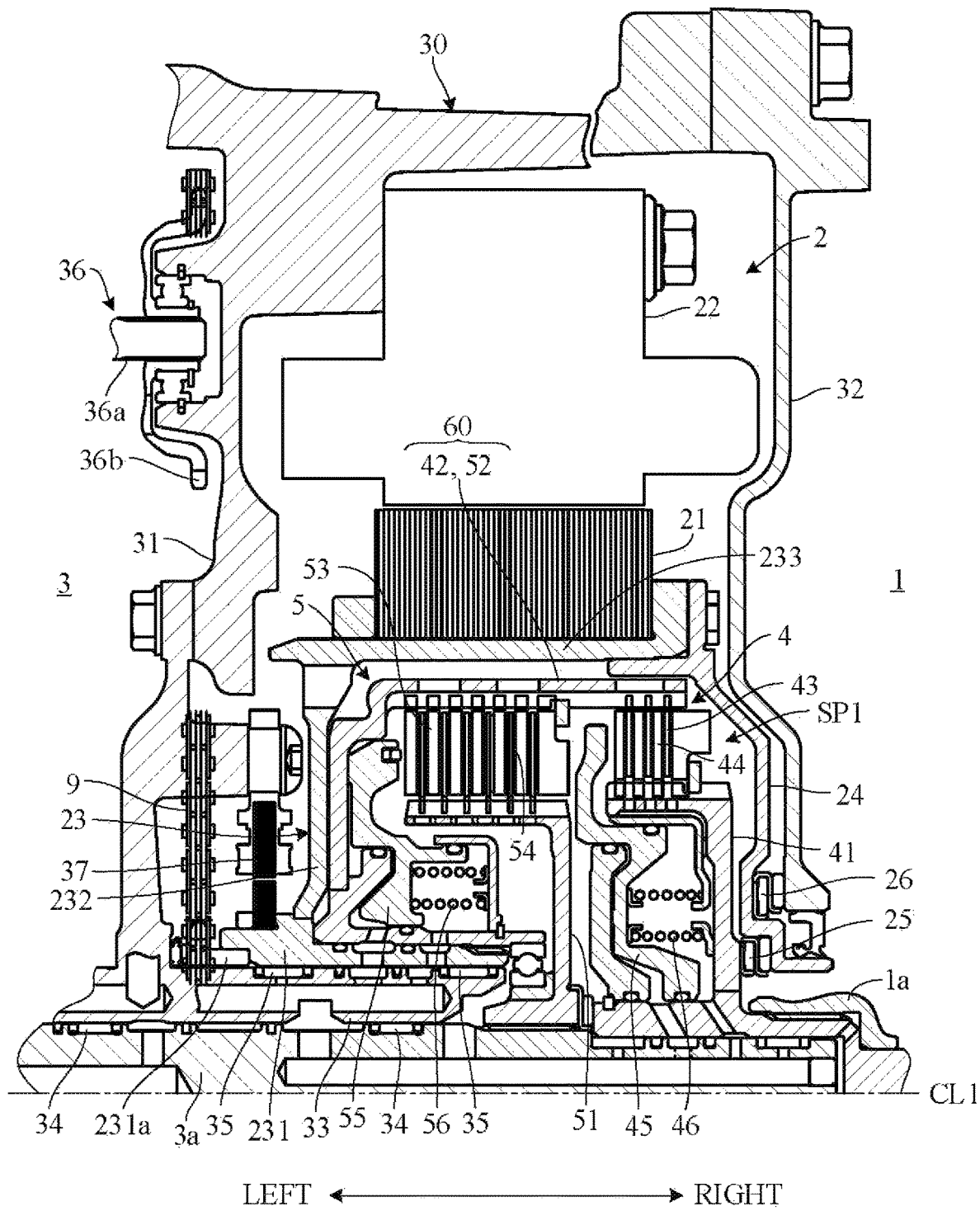
FIG. 2 is a sectional view showing essential components of a hybrid vehicle drive unit of FIG. 1.

FIG. 2 is a sectional view showing essential components of the hybrid vehicle drive unit 100 of FIG. 1. For convenience of explanation, CL1 in the drawing is defined to be a lateral axis, and relation among structural components is explained using this definition. Lateral direction corresponds to vehicle longitudinal direction or width direction, for example. Axis CL1 is coincident with center of rotation of the output shaft 1a of the engine 1 (FIG. 1), the motor 2 and the input shaft 3a of the transmission 3. The motor 2 is oriented coaxially with the output shaft 1a and the input shaft 3a. Direction parallel to axis CL1 (lateral direction) is called axial direction and direction orthogonal to axis CL1 is called radial direction.

As shown in FIG. 2, mainly the motor 2, the disconnect clutch 4 and the start clutch 5 are installed between radially extending left and right side walls (left side wall 31 and right side wall 32). The side walls 31 and 32 constitute part of a transmission case and other case members 30 rigidly mounted in and engine room. The transmission 3 is installed on the left side of the left side wall 31, and the engine 1 is installed on the right side of the right side wall 32. Optionally, a damper for absorbing rotational fluctuation of the engine 1 can be provided between the right side wall 32 and the engine 1. The side walls 31 and 32 define an opening centered on axis CL1.

A substantially cylindrical shaft member 33 centered on axis CL1 is provided to extend rightward and leftward at a radially inner end portion of the left side wall 31. An input shaft 3a is rotatably supported inside (in opening of) the shaft member 33 by multiple axially spaced bearings 34. The bearings 34 are constituted as needle bearings, for example. The input shaft 3a projects and extends rightward from the right end face of the shaft member 33 and penetrates an inner side (opening) of the right side wall 32.

The motor 2 comprises a substantially cylindrical rotor 21 centered on axis CL1 and a substantially cylindrical stator 22 installed centered on axis CL1 to surround the rotor 21 at a specified clearance from an outer peripheral surface of the rotor 21. The stator 22 is fastened to the left side wall 31 by through bolts. The rotor 21 is rotatably supported by a rotor support member 23.

The rotor support member 23 comprises an axis CL-centered substantially cylindrical shaft member 231 rotatably fitted on an outer peripheral surface of the shaft member 33 through multiple axially spaced bearings 35, a side wall member 232 extending radially outward from the shaft member 231 leftward of a left end face of the rotor 21 so as to face the left side wall 31, and an axis CL-centered substantially cylindrical retaining member 233 extending rightward from a radially outer end portion of the side wall member 232. The bearings 35 are constituted as needle bearings, for example. An inner peripheral surface of the rotor 21 is fitted on the outer peripheral surface of the retaining member 233, and the rotor 21 is fixed on the retaining member 233. As a result, the rotor 21 is cantilevered from the shaft member 33 through the rotor support member 23.

A resolver 37 is attached to the left side wall 31 so as to face the shaft member 231 of the rotor support member 23. Since the shaft member 231 rotates integrally with the rotor 21 of the motor 2, the resolver 37 can detect rotation angle of the rotor 21. In addition, a hydraulic pump 36 (only partially visible) is attached to the left side wall 31. When its rotating shaft 36a is rotated, the hydraulic pump 36 supplies hydraulic oil to, inter alia, various hydraulic components in the transmission 3 and the clutches 4 and 5, and also supplies lubricating oil to points requiring lubrication. The hydraulic pump 36 has a gear unit 36b that rotates integrally with the rotating shaft 36a.

The left end portion of the shaft member 231 of the rotor support member 23 is, at the same axial position as the gear unit 36b, provided throughout its circumference with a gear unit 231a. An endless belt-like chain 9 is wound around the gear unit 36b and gear unit 231a, thereby arranging the chain 9 between the rotor support member 23 and the left side wall 31. Rotation of the motor 2 is therefore transmitted through the chain 9 to the hydraulic pump 36, whereby the hydraulic pump 36 can be driven irrespective of engine 1 starting and/or the clutch 4 and 5 operation. Alternatively, a belt can be used in place of the chain 9.

The start clutch 5 and the disconnect clutch 4 are arranged laterally in tandem on the right side of the side wall member 232, within a space SP1 radially inward of the retaining member 233. The clutches 4 and 5 are configured as multi-plate wet clutches and constitute the clutch apparatus according to this embodiment of the present invention. In addition to the foregoing, a cover 24 is fastened to the right end portion of the retaining member 233 in order to form an oil chamber.

The disconnect clutch 4 comprises a clutch hub 41, a clutch drum 42, outer plates 43, inner plates 44, a clutch piston 45, and a return spring 46. Similarly, the start clutch 5 comprises a clutch hub 51, a clutch drum 52, outer plates 53, inner plates 54, a clutch piston 55, and a return spring 56. The clutch drums 42 and 52 share a single common clutch drum hereinafter designated by symbol 60.

Figure 3:
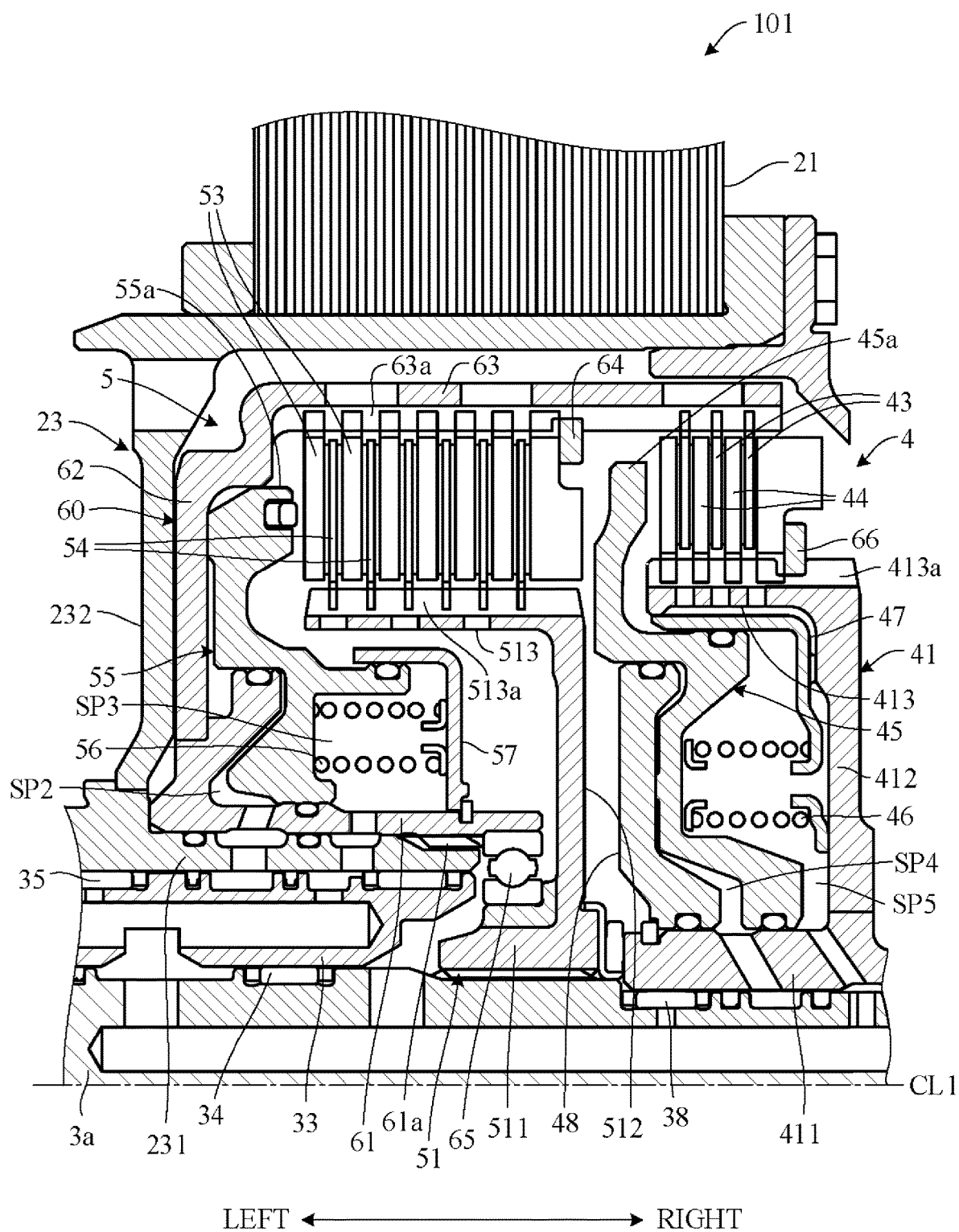
FIG. 3 is an enlarged view of an essential part of FIG. 2 showing structure of a clutch apparatus according to the embodiment.

There now follows a detailed explanation of the structure of the vehicle clutch apparatus according an embodiment of the present invention. FIG. 3 is an enlarged view of an essential part of FIG. 2 showing structure of a clutch apparatus 101 according to the embodiment. As shown in FIG. 3, the clutch drum 60 comprises an axis CL1-centered substantially cylindrical shaft member 61 fitted on an outer peripheral surface of the shaft member 231 of the rotor support member 23, a side wall member 62 extending radially outward from a left end portion of the shaft member 61, and an axis CL1-centered substantially cylindrical guide member 63 extending rightward from a radially outer end portion of the side wall member 62.

The shaft member 61 fits on the shaft member 231 and is engaged with the shaft member 231 through a spline 61a formed on its inner peripheral surface. More specifically, at its left end portion, the shaft member 61 fits on the shaft member 231 over a predetermined axial length up to abutment on the rotor support member 23, and is spline-coupled to the shaft member 231. Since the shaft member 61 of the clutch drum 60 is therefore unified with the shaft member 231 of the rotor support member 23, the clutch drum 60 rotates integrally with the rotor support member 23. A right end portion of the shaft member 61 projects rightward beyond a right end face of the shaft member 231. The side wall member 62 is arranged slightly spaced from or in abutment with the side wall member 232 of the rotor support member 23.

A spline 63a is formed on the inner peripheral surface of the guide member 63, and the multiple outer plates 43 of the disconnect clutch 4 and the multiple outer plates 53 of the start clutch 5 axially movably engage the spline 63a. Moreover, a stop 64 for limiting rightward movement of the outer plates 53 is fixed on the inner peripheral surface of the guide member 63 at a specified axial position, and the outer plates 53 and the outer plates 43 axially movably engage the stop 64 on its left side and right side, respectively.

The clutch hub 51 of the start clutch 5 comprises an axis CL1-centered substantially cylindrical shaft member 511, a side wall 512 extending radially outward from a right end portion of the shaft member 511 and passing rightward of the shaft member 61 of the clutch drum 60, and an axis CL1-centered substantially cylindrical guide member 513 extending leftward from a radially outer end of the side wall 512. An inner peripheral surface of the shaft member 511 is spline-coupled with an outer peripheral surface of the input shaft 3a, so that the clutch hub 51 rotates integrally with the input shaft 3a.

An outer peripheral surface of the guide member 513 of the clutch hub 51 faces the inner peripheral surface of the guide member 63 of the clutch drum 60. Splines 513a are formed on this outer surface, and the multiple inner plates 54 are axially (laterally) movably engaged with the splines 513a alternately with the outer plates 53. The outer plates 53 and inner plates 54 are collectively called a plate group.

The clutch piston 55 of the start clutch 5 is slidably fitted on an outer peripheral surface of the shaft member 61 of the clutch drum 60. A spring seat plate 57 is supported on the outer peripheral surface of the shaft member 61 at a specified position rightward of the clutch piston 55, and the return spring 56 is interposed between the clutch piston 55 and the spring seat plate 57. An abutment member 55a is provided on a radially outward right end portion of the clutch piston 55 so as to abut a left end face of the plate group 53-54 (more exactly, left end face of the leftmost outer plate 53). Oil chambers SP2 and SP3 are formed between the clutch piston 55 and the side wall member 62 and between the clutch piston 55 and the spring seat plate 57, respectively.

In initial state prior to application of hydraulic pressure to the oil chamber SP2, the clutch piston 55 is pushed leftward by biasing force of the return spring 56, as illustrated, whereby the clutch piston 55 abuts the side wall member 62 of the clutch drum 60. In this state, no contacting pressure acts between the outer plates 53 and the inner plates 54, so that the plates 53 and 54 are mutually rotatable. Since the start clutch 5 is therefore disengaged, transmission of motive power between the rotor 21 of the motor 2 and the input shaft 3a of the transmission 3 is cut off.

On the other hand, when hydraulic pressure supplied through oil supply passages provided in the input shaft 3a and shaft members 33, 231 and 61 is applied to the oil chamber SP2, the clutch piston 55 is pushed rightward overcoming the biasing force of the return spring 56. Since the outer plates 53 and inner plates 54 are therefore pushed rightward, contacting pressure acting mutually among the plates 53 and 54 engages the start clutch 5. As a result, transmission of motive power from the rotor 21 of the motor 2 through the start clutch 5 to the input shaft 3a is enabled.

(Hydraulic pressure (very low hydraulic pressure) can be supplied to the oil chamber SP3 through the oil supply passages provided in the input shaft 3a and shaft members 33, 231 and 61.) Leftward pressing force acting on the clutch piston 55 is mostly biasing force of the return spring 56 and centrifugal hydraulic pressure produced by rotation of the clutch proper, and engaging force of the start clutch 5 can be adjusted by adjusting hydraulic force counter to this pressing force acting in the oil chamber SP2.

The clutch hub 41 of the disconnect clutch 4 comprises an axis CL1-centered substantially cylindrical shaft member 411, a side wall 412 extending radially outward from an axially center portion of the shaft member 411, and an axis CL1-centered substantially cylindrical guide member 413 extending leftward from a radially outer end of the side wall 412. The shaft member 411 is relatively rotatably fitted on the outer peripheral surface of the input shaft 3a through multiple axially spaced bearings 38. The bearings 38 are constituted as needle bearings, for example.

As shown in FIG. 2, a right end portion of the shaft member 411 of the clutch hub 41 is spline-coupled to a left end portion of the output shaft a of the engine 1, so that the clutch hub 41 rotates integrally with the output shaft 1a. A bearing 25 (e.g., a needle bearing) is interposed between the side wall 412 of the clutch hub 41 and the cover 24. A bearing 26 (e.g., a needle bearing) is also interposed between the cover 24 and the right side wall 32.

As shown in FIG. 3, an outer peripheral surface of the guide member 413 of the clutch hub 41 faces the inner peripheral surface of the guide member 63 of the clutch drum 60. Splines 413a are formed on this outer surface, and the multiple inner plates 44 are axially (laterally) movably engaged with the splines 413a alternately with the outer plates 43. The outer plates 43 and inner plates 44 are collectively called a plate group.

The clutch piston 45 of the start clutch 4 is slidably fitted on an outer peripheral surface of the shaft member 411 of the clutch hub 41. A spring seat plate 47 is fitted radially inward of the guide member 413 of the clutch hub 41. A right end face of the spring seat plate 47 abuts a left end face of the side wall 412 of the clutch hub 41, and the return spring 46 is interposed between the clutch piston 45 and the spring seat plate 47. A stop plate 48 for limiting leftward movement of the clutch piston 45 is fitted on the outer peripheral surface the shaft member 411 of the clutch hub 41. An abutment member 45a is provided on a radially outward right end portion of the clutch piston 45 so as to abut a left end face of the plate group 43-44 (more exactly, left end face of the leftmost outer plate 44). Oil chambers SP4 and SP5 are formed between the clutch piston 45 and the stop plate 48 and between the clutch piston 45, the clutch hub 41 and the spring seat plate 47, respectively.

In initial state prior to application of hydraulic pressure to the oil chamber SP4, the clutch piston 45 is pushed leftward by biasing force of the return spring 46, as illustrated, whereby the clutch piston 45 abuts the stop plate 48. In this state, no contacting pressure acts between the outer plates 43 and the inner plates 44, so that the plates 43 and 44 are mutually rotatable. Since the disconnect clutch 4 is therefore disengaged, transmission of motive power between the rotor 21 of the motor 2 and the output shaft 1a (FIG. 2) of the engine 1 is cut off.

On the other hand, when hydraulic pressure supplied through oil supply passages provided in the input shaft 3a and shaft member 411 is applied to the oil chamber SP4, the clutch piston 45 is pushed rightward overcoming the biasing force of the return spring 46. Since the outer plates 43 and inner plates 44 are therefore pushed rightward, contacting pressure acting mutually among the plates 43 and 44 engages the disconnect clutch 4. As a result, transmission of motive power from the rotor 21 of the motor 2 through the disconnect clutch 4 to the output shaft 1a is enabled. (Hydraulic pressure (very low hydraulic pressure) can be supplied to the oil chamber SP5 through the oil supply passages provided in the input shaft 3a and shaft member 411.) Leftward pressing force acting on the clutch piston 45 is mostly biasing force of the return spring 46 and centrifugal hydraulic pressure produced by rotation of the clutch proper, and engaging force of the disconnect clutch 4 can be adjusted by adjusting hydraulic force counter to this pressing force acting in the oil chamber SP4.

As a characterizing structural feature of the present embodiment, a bearing 65 is interposed between an inner peripheral surface of the right end portion of the shaft member 61 of the clutch drum 60 and the outer peripheral surface of the shaft member 511 of the clutch hub 51 of the start clutch 5. Namely, the bearing 65 is disposed in a space on the right of the shaft member 33 of the case members 30 and on the right of the shaft member 231 of the rotor support member 23. The bearing 65 is constituted as a ball bearing, for example. As a result, axial length of the bearing 65 can be minimized, so that the bearing 65 can be easily disposed at an axially narrow installation site. A site for installing the bearing 65 is also easy to machine at, for example, at a location such as the inner peripheral surface of the shaft member 61 and the outer peripheral surface of the shaft member 511. Radial length of the bearing 65 from its inner peripheral surface to its outer peripheral surface can be made longer than its axial length, whereby the bearing 65 can be easily installed at a place where radial clearance between the shaft member 511 and the shaft member 61 is relatively large.

Figure 4:
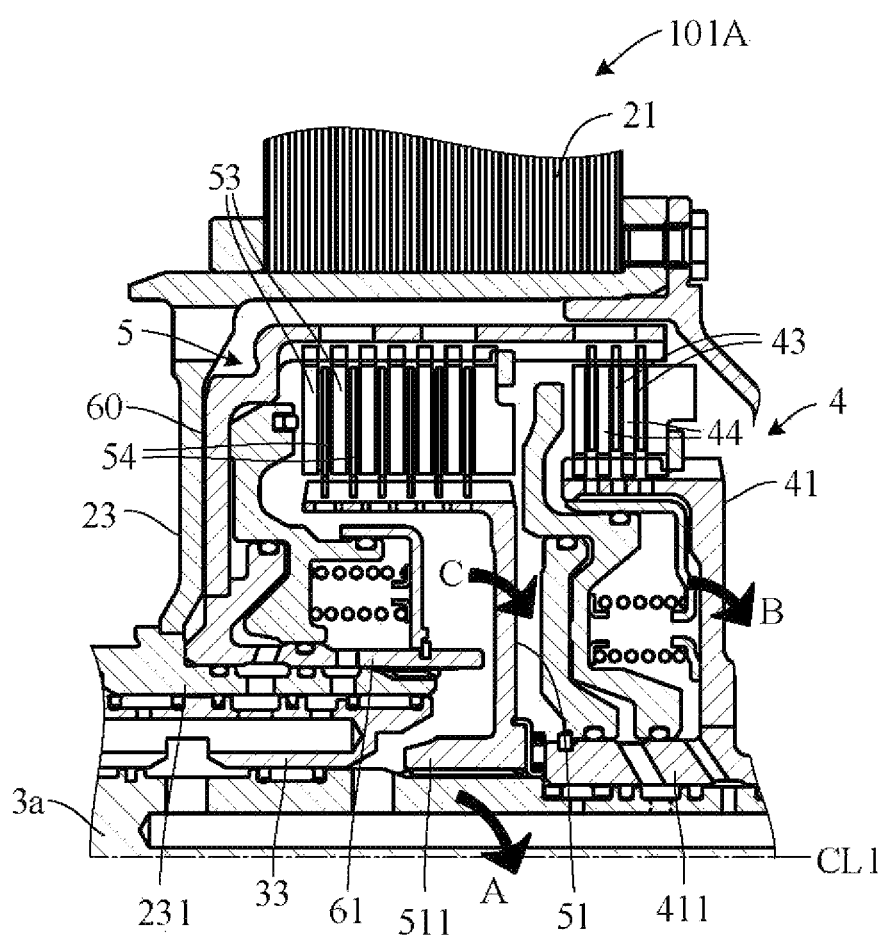
FIG. 4 is a diagram showing an example for comparison with FIG. 3.

FIG. 4 shows a clutch apparatus 101A as an example for comparison with the clutch apparatus 101 of FIG. 3. Differently from the clutch apparatus 101 of FIG. 3, the clutch apparatus 101A is missing the bearing between the shaft member 61 of the clutch drum 60 and the shaft member 511 of the clutch hub 51.

In the clutch apparatus 101A of FIG. 4, when, for example, a bending moment acts on the input shaft 3a and bends the input shaft 3a in arrow A direction around a distal end portion of the shaft member 33 of the case members 30, the clutch hub 51 of the start clutch 5 spline-coupled to the input shaft 3a and the clutch hub 41 of the disconnect clutch 4 fitted on the outer peripheral surface of the input shaft 3a tilt in arrow B direction and arrow C direction with respect to axis CL1, respectively. Since the clutch drum 60 is supported on the outer peripheral surface of the shaft member 231 of the rotor support member 23 fitted on the outer peripheral surface of the input shaft 3a, no tilting like that of the clutch hubs 41 and 51 arises in the clutch drum 60 at this time, so that circumferentially and radially uneven contact occurs between the outer plates 43, 53 and the inner plates 44, 54. Surface pressure between the outer plates 43, 53 and the inner plates 44, 54 therefore varies and produces forced vibration during clutch operation. Vibration is particularly great when the clutches 4 and 5 are simultaneously engaged, such as during push-starting of the engine 1.

In contrast, in the present embodiment, the bearing 65 interposed between the shaft member 61 of the clutch drum 60 and the shaft member 511 of the clutch hub 51, as shown in FIG. 3, restrains movement of the shaft member 511, whereby the bearing 65 minimizes tilting of the clutch hub 51 with respect to axis CL1. As a result, bending of the input shaft 3a is inhibited, so that tilting of the clutch hub 41 with respect to axis CL1 can also be inhibited. Since tilting of the clutch hubs 41 and 51 is minimized in this manner, the outer plates 43, 53 and the inner plates 44, 54 contact uniformly over their entire surfaces, whereby vibration is favorably avoided.

The present embodiment can achieve advantages and effects such as the following:

(1) The clutch apparatus 101 comprises: the output shaft 1a of the engine 1 and input shaft 3a of the transmission 3 rotatable around the axis CL1; the rotor 21 of the motor 2 rotatable around the axis CL1; the multi-plate wet disconnect clutch 4 for connecting and disconnecting the first power transmission path TL1 between the output shaft 1a and the rotor 21; the multi-plate wet start clutch 5 for connecting and disconnecting the second power transmission path TL2 between the rotor 21 and the input shaft 3a; and the case members 30 having the substantially cylindrical shaft member 33 centered on and extending along the axis CL1 (FIGS. 1 and 2). The disconnect clutch 4 and the start clutch 5 are arranged laterally in tandem and respectively comprise the multiple inner plates 44, 54 and multiple outer plates 43, 53 alternately arranged axially to be mutually rotatable relative to one another, the clutch hub 41, 51 having the guide member 413, 513 axially movably supporting radially inner end portions of the inner plates 44, 54, and the clutch drum 60 (42, 52) having the guide member 63 axially movably supporting radially outer end portions of the outer plates 43, 53 (FIGS. 2 and 3). Radially inward of the guide member 413, the clutch hub 41 of the disconnect clutch 4 has the shaft member 411 of axis CL1-centered substantially cylindrical structure integrally rotatably connected to the output shaft 1a (FIG. 3). Radially inward of the guide member 513, the clutch hub 51 of the start clutch 5 has the shaft member 511 of axis CL1-centered substantially cylindrical structure integrally rotatably connected to the input shaft 3a (FIG. 3). The clutch drum 42 of the disconnect clutch 4 and the clutch drum 52 of the start clutch 5 are constituted by the single shared clutch drum 60, and the clutch drum 60 is integrally rotatably connected to the rotor 21 and has the shaft member 61 of axis CL1-centered substantially cylindrical structure radially inward of the guide member 63 and radially outward of the shaft member 511 of the clutch hub 51 (FIG. 3). The bearings 34 are provided between the outer peripheral surface of the input shaft 3a and the inner peripheral surface of the shaft member 33 of the case members 30, the bearings 38 are provided between the outer peripheral surface of the input shaft 3a and the inner peripheral surface of the shaft member 411 of the clutch hub 41, and the bearing 65 is provided between the outer peripheral surface of the shaft member 511 of the clutch hub 51 and the inner peripheral surface of the shaft member 61 of the clutch drum 60 (FIG. 3).

Owing to this structure, the bearing 65 inhibits tilting of the clutch hub 51 with respect to axis CL1 when a bending moment acts on the input shaft 3a, whereby vibration due to varying surface pressure between the outer plates 53 and inner plates 54 during operation of the start clutch 5 can be minimized. Moreover, since tilting of the clutch hub 41 due to bending of the input shaft 3a is inhibited, vibration caused by varying surface pressure between the outer plates 43 and inner plates 44 during operation of the disconnect clutch 4 can be minimized.

(2) The multiple axially spaced bearings 35 are provided between the outer peripheral surface of the shaft member 33 of the case members 30 and the inner peripheral surface of the shaft member 61 of the clutch drum 60, more exactly between the outer peripheral surface of the shaft member 33 and the inner peripheral surface of the shaft member 231 of the rotor support member 23 provided integrally with the shaft member 61 (FIG. 3). Since this enhances support rigidity of the clutch drum 60, tilting of the clutch drum 60 with respect to the axis CL1 is suppressed to further improve vibration suppression.

(3) The bearing 65 provided between the outer peripheral surface of the shaft member 511 of the clutch hub 51 and the inner peripheral surface of the shaft member 61 of the clutch drum 60 is constituted by a ball bearing (FIG. 3). As a result, axial length of the bearing 65 can be minimized, whereby the bearing 65 can be easily disposed in a narrow installation space and machining required for installation of the bearing 65 is also facilitated.

(4) The clutch apparatus 101 is applied to a hybrid vehicle having the disconnect clutch 4 for transmitting or not transmitting motive power between the output shaft 1a of the engine 1 and the rotor 21 of the motor 2 and the start clutch 5 for transmitting or not transmitting motive power between the rotor 21 and the input shaft 3a of the transmission 3. In this kind of hybrid vehicle, the disconnect clutch 4 and the start clutch 5 are sometimes simultaneously engaged, such as during push-starting of the engine 1, and since vibration tends to become intense in this case, need to inhibit vibration is high. Regarding this point, the bearing 65 interposed between the shaft members 61 and 511 in the present embodiment ensures excellent suppression of vibration even when the clutches 4 and 5 are simultaneously engaged.

In the aforesaid embodiment, the disconnect clutch 4 that connects or disconnects the first power transmission path TL1 between the output shaft 1a of the engine 1 (the first rotating shaft) and the rotor 21 of the motor 2 (the rotor) is used as the first clutch and the start clutch 5 that connects or disconnects the second power transmission path TL2 between the rotor 21 and the input shaft 3a of the transmission 3 (the second rotating shaft) is used as the second clutch, but the first clutch and second clutch arranged laterally in tandem are not limited to this configuration. Therefore, the clutch apparatus of the present invention can also be applied to a vehicle other than a hybrid vehicle. For example, the present invention can be similarly applied to a clutch apparatus having an odd-numbered speed stage clutch and an even-numbered speed stage clutch arranged axially in tandem.

In the aforesaid embodiment, a configuration is adopted wherein the side walls 412 and 512 of the clutch hubs 41 and 51 of the pair of clutches 4 and 5 extend radially outward from the right end portions of the shaft members 411 and 511, but an alternative configuration can be adopted wherein at least one of the side walls 412 and 512 extends radially outward from a left end portion of the shaft member 411 or 511. In other words, the first clutch and second clutch can be configured with the clutch hubs 41 and 51 and the clutch pistons 45 and 55 in left-right reversed (mirror image) arrangement.

The configuration of the clutch hub 41, 51 having the guide member 413, 513 as the inner cylindrical member that axially movably supports the radially inner end portion of the inner plates 44, 54 (the first plates) and the configuration of the clutch drum 60 having the guide member 63 as the outer cylindrical member that axially movably supports the radially outer end portion of the outer plates 43, 53 (the second plates) are not limited to those described in the foregoing. Specifically, the configuration of the clutch hub of the first clutch is not limited to that described in the foregoing insofar as it is configured in an axis CL1-centered substantially cylindrical shape on the radially inward side of the guide member 413 and has the first rotating shaft member (e.g., the shaft member 411) integrally rotatably connected to the output shaft 1*a* or other first rotating shaft. And the configuration of the clutch hub of the second clutch is not limited to that described in the foregoing insofar as it is configured in an axis CL1-centered substantially cylindrical shape on the radially inward side of the guide member 513 and has the second rotating shaft member (e.g., the shaft member 511) integrally rotatably connected to the input shaft 3*a* or other second rotating shaft. The configuration of the shared single clutch drum is not limited to that described in the foregoing insofar as it is integrally rotatably connected to the rotor 21 or other rotor and has the third rotating shaft member (e.g., the shaft member 61) of axis CL1-centered substantially cylindrical structure radially inward of the guide member 63 and radially outward of the shaft member 511.

In the aforesaid embodiment, a configuration is adopted wherein needle bearings are provided as the bearings 34 between the outer peripheral surface of the input shaft 3*a* and the inner peripheral surface of the shaft member 33 serving as the non-rotating shaft member, needle bearings are provided as the bearings 38 between the outer peripheral surface of the input shaft 3*a* and the inner peripheral surface of the shaft member 411, and needle bearings are provided as the bearings 35 between the outer peripheral surface of the shaft member 33 and the inner peripheral surface of the shaft member 231 integral with the shaft member 61, but these bearings are not limited to needle bearings and can instead be ball bearings, bushings or the like. In the aforesaid embodiment, a configuration is adopted wherein a ball bearing is provided as the bearing 65 between the outer peripheral surface of the shaft member 511 and the inner peripheral surface of the shaft member 61, but this bearing is not limited to a ball bearing and can instead be a needle bearing, bushing or the like. When the bearing 65 is provided between the shaft member 511 and the shaft member 61, the bearings 35 between the shaft member 33 and the shaft member 231 can be omitted.

The above embodiment can be combined as desired with one or more of the above modifications. The modifications can also be combined with one another.

According to the present invention, it is possible to inhibit tilting of a clutch hub when bending moment acts on a rotating shaft, thereby minimizing vibration during operation of the clutch.

Above, while the present invention has been described with reference to the preferred embodiments thereof, it will be understood, by those skilled in the art, that various changes and modifications may be made thereto without departing from the scope of the appended claims.

What is claimed is:

1. A vehicle clutch apparatus, comprising:
a first rotating shaft and a second rotating shaft each rotatable around an axis line;
a rotating member rotatable around the axis line;
a first clutch of multi-plate wet type configured to connect and disconnect a first power transmission path between the first rotating shaft and the rotating member;
a second clutch of multi-plate wet type configured to connect and disconnect a second power transmission path between the rotating member and the second rotating shaft;
a case member having a non-rotating shaft member of substantially cylindrical shape extending around the axis line; wherein
the first clutch and the second clutch are arranged side by side in an axial direction of the axis line, and each of the first clutch and the second clutch has a plurality of first plates and a plurality of second plates alternately arranged in the axial direction to be rotatable relative to each other, a clutch hub having an inner cylindrical member supporting radially inner end portions of the plurality of first plates movably in the axial direction, and a clutch drum having an outer cylindrical member supporting radially outer end portions of the plurality of second plates movably in the axial direction,
the clutch hub of the first clutch has a first rotating shaft member configured in substantially cylindrical shape around the axis line, radially inward of the inner cylindrical member and integrally rotatably connected to the first rotating shaft,
the clutch hub of the second clutch has a second rotating shaft member configured in substantially cylindrical shape around the axis line, radially inward of the inner cylindrical member and integrally rotatably connected to the second rotating shaft,
the clutch drum of the first clutch and the clutch drum of the second clutch are constituted by a single shared clutch drum, the single shared clutch drum is integrally rotatably connected to the rotating member, and has a third rotating shaft member of substantially cylindrical shape around the axis line radially inward of the outer cylindrical member and radially outward of the second rotating shaft member, and
bearings are provided between an outer peripheral surface of the second rotating shaft and an inner peripheral surface of the non-rotating shaft member, between the outer peripheral surface of the second rotating shaft and an inner peripheral surface of the first rotating shaft member, and between an outer peripheral surface of the second rotating shaft member and an inner peripheral surface of the third rotating shaft member, respectively.

2. The vehicle clutch apparatus according to claim 1, wherein
a bearing is further provided between an outer peripheral surface of the non-rotating shaft member and the inner peripheral surface of the third rotating shaft member.

3. The vehicle clutch apparatus according to claim 2, wherein
the bearing provided between the outer peripheral surface of the non-rotating shaft member and the inner peripheral surface of the third rotating shaft member is constituted as a plurality of needle bearings arranged in the axial direction.

4. The vehicle clutch apparatus according to claim 1, wherein
the bearing provided between the outer peripheral surface of the second rotating shaft member and the inner peripheral surface of the third rotating shaft member is constituted as a ball bearing.

5. The vehicle clutch apparatus according to claim 1, wherein
the bearing provided between the outer peripheral surface of the second rotating shaft and the inner peripheral surface of the non-rotating shaft member is constituted as a plurality of needle bearings arranged in the axial direction.

6. The vehicle clutch apparatus according to claim 1, wherein the bearing provided between the outer peripheral surface of the second rotating shaft and the inner peripheral surface of the first rotating shaft member is constituted as a plurality of needle bearings arranged in the axial direction.

7. The vehicle clutch apparatus according to claim 1, wherein the first rotating shaft is an output shaft of a prime mover,
the second rotating shaft is an input shaft of a transmission, and
the rotating member is a rotor of an electric motor.

* * * * *